DAVID M. HARKRADER, OF CHILI, ILLINOIS.

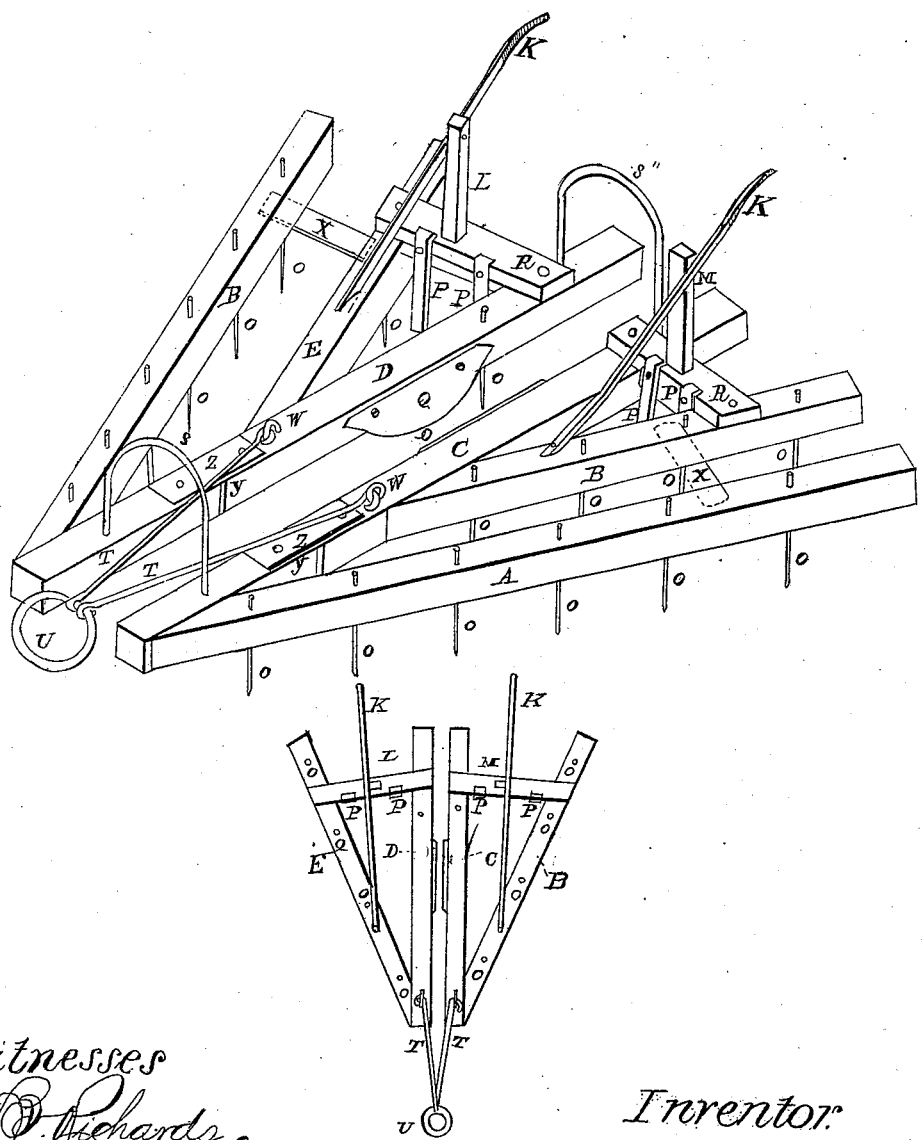

Letters Patent No. 82,942, dated October 13, 1868.

IMPROVEMENT IN COMBINED HARROW AND CULTIVATOR.

The Schedule referred to in these Letters Patent and making part of the same.

*To all whom it may concern:*

Be it known that I, DAVID M. HARKRADER, of Chili, county of Hancock, and State of Illinois, have invented a new and useful Combined Harrow and Cultivator, for harrowing the ground, and for cultivating plants in rows; and I do hereby declare the following to be a full, clear, and exact description of the construction and operation of the same, reference being had to the annexed drawings, making a part of this specification, in which.—

Figure 1 is a perspective view, and
Figure 2 is a sectional view.

Similar letters of reference indicate corresponding parts.

The nature of my invention relates to an improved combined harrow and cultivator; and the invention consists in a peculiar arrangement of the different parts, whereby it may be easily convertible into either a harrow or cultivator, and produce an effectual implement in either case, and at a very low price.

To enable others skilled in the art to make and use my invention, I will proceed to the following fuller and clearer description of its construction and operation.

Letters A B C D E F, fig. 1, represent the different pieces which, in connection with the pieces H and J, constitute the main frame.

Letters K, fig. 1, represent handles, bolted on at their forward end to one of the pieces of the main frame, and supported back by the vertical braces L M.

Letters O, fig. 1, represent common harrow-teeth.

Letters P, fig. 1, represent "shovels," such as are used on double or single-shovel plows, only they are extended at the upper end.

Letters Q Q, fig. 1, represent knives or cutters, the number of which may be increased by framing in pieces to attach them to, parallel with the pieces C and D.

Letters R R, fig. 1, represent cross-pieces, framed or bolted to pieces of the main frame, and carrying the cultivator-shovels, and supporting the braces L and M.

Letters S S", fig. 1, represent bows, for holding the two halves A B C and D E F together. These bows or joinings are constructed high enough to allow growing plants to pass under them, and they may be made either solid or hinged.

Letters T T and U represent the hitching-device, which is connected or attached to the main frame, back or forward, at any desirable point, by means of the eyes W W.

Letters X X, fig. 1, represent plates, for more firmly securing the outer frame to the inner one.

Letters Y Y represent joints in the frame-pieces C and D, and letters Z Z represent plates bolted on the pieces C and D, above and below. By taking off these plates, the frame may be taken apart at the joints Y Y, and by bolting on the plates, the frame may be secured firmly together again.

The cutters Q Q will operate as shields, when on the pieces C and D, to prevent the clods, &c., from rolling against the row of plants, when using the device as a corn-cultivator.

For use as a harrow, or for stirring "fall plowing," the whole device is used as shown at fig. 1.

For use as a cultivator for plants in rows, the plates Z Z are taken off, which releases the outside frame-pieces by taking off the plates X X; then, by moving the bow S back of the joint Y Y, the frame, as shown at fig. 2, may be used as a cultivator, and furnishes a style and kind of cultivator preferred by a great many farmers for all purposes for which a cultivator is used; and by about all farmers for "going through" corn or other plants in rows when small, and when the ground between the rows needs thorough stirring and pulverizing.

Having thus described my invention,

What I claim as new, and desire to secure by Letters Patent, is—

1. The knives or cutters Q Q, combined with the frame-pieces B, C, D, and E, and the shovels P P, teeth O O, handles K K, cross-pieces R R, bows S S", and hitching-device T T U, constructed and arranged as described, and for the purpose set forth.

2. The combination of the frame A F, substantially as described, with the frame B, C, D, and E, constructed and arranged as described, and for the purpose set forth.

DAVID M. HARKRADER.

Witnesses:
THOMAS S. NEWLAND,
CHARLES B. TRIPP.